July 15, 1958

N. CHUY 2,843,334

SPINNING REEL

Filed Jan. 30, 1956

INVENTOR.
Nicholas Chuy

July 15, 1958 — N. CHUY — 2,843,334
SPINNING REEL
Filed Jan. 30, 1956 — 2 Sheets-Sheet 2
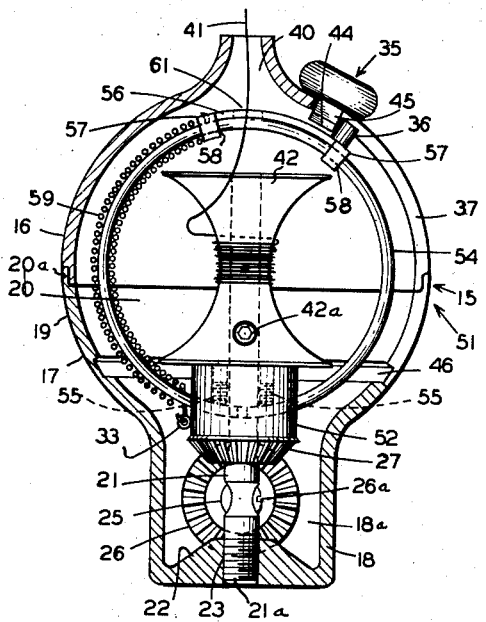
Fig. 7.
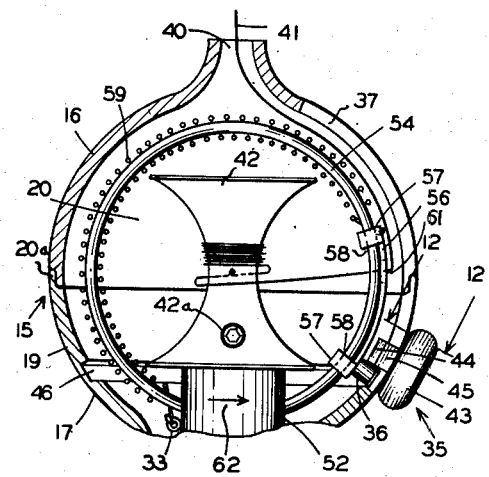
Fig. 8.
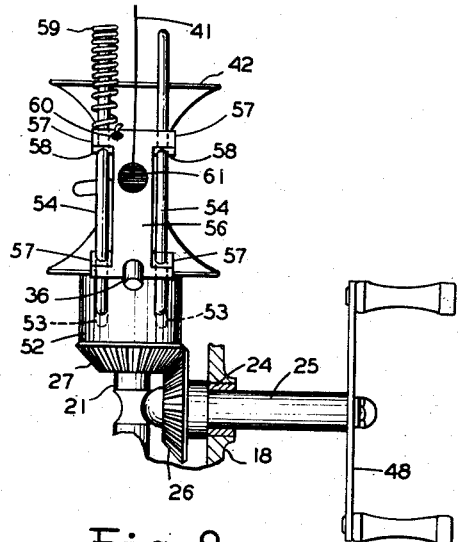
Fig. 9.
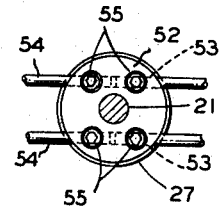
Fig. 10.
Fig. 11.
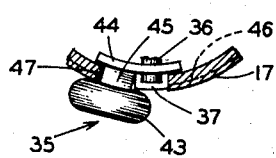
Fig. 12.
INVENTOR.
Nicholas Chuy _United States Patent Office_

2,843,334
Patented July 15, 1958

2,843,334

SPINNING REEL

Nicholas Chuy, Detroit, Mich.

Application January 30, 1956, Serial No. 562,117

6 Claims. (Cl. 242—84.2)

This invention relates to a novel spinning reel of simple construction having means to permit a fishing line to be readily spun longitudinally from the reel, and including means for readily winding a fishing line onto the reel by a simple adjustment of certain of the reel parts.

Another object of the invention is to provide a novel construction of spinning type fishing reel which readily adapts itself to be mounted in substantially an enclosed position within a housing, from which the fishing line may be readily payed outwardly by a spinning action or drawn inwardly and wound on the reel by rotation of a revolvably mounted part of the reel.

Various other objects and advantages of the invention will hereinafter become more fully apparent from the following description of the drawings, illustrating presently preferred embodiments thereof, and wherein:

Figure 7 is a longitudinal, substantially central sectional view, partly in elevation, of another form of the fishing reel and with the parts disposed for spinning a line therefrom;

Figure 8 is a fragmentary longitudinal substantially central sectional view showing the reel with the parts thereof positioned for winding the line thereon;

Figure 9 is a top plan view, partly broken away and with a substantial part of the casing omitted, showing the line winding mechanism;

Figure 10 is an end elevational view, similar to Figure 5, with parts shown broken away, illustrating a portion of the winding mechanism;

Figure 11 is an end elevational view of another part of the reel winding mechanism shown removed from the reel, and Figure 12 is a detailed sectional view taken substantially along a plane as indicated by the line 12—12 of Figure 8.

Figure 1:
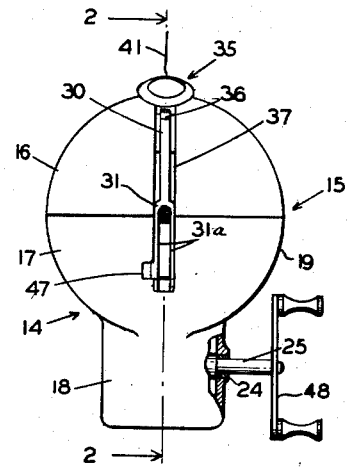
Figure 1 is a top plan view of the novel fishing reel.

Referring more specifically to the drawings and first with reference to Figures 1 to 6, the fishing reel, designated generally 14 and comprising the invention, includes a reel housing or casing, designated generally 15, consisting of a forward section 16 and a rear section, designated generally 17. The forward housing or casing section 16 is substantially hemispherical. The rear casing section 17 includes a rear portion 18 which is substantially cylindrical and a forward portion 19 which is flared from the forward end of the rear portion 18, to provide a part of modified hemispherical shape which coacts with the forward section 16 to form a substantially spherical hollow chamber 20, the rear end of which communicates with the hollow chamber 18a of said rear portion 18. The rear end of the forward section 16 and the forward end of the rear section 17 have interlapping portions 20a forming a joint by which the casing sections are connected. Any suitable means, not shown, may be provided for retaining the joint parts 20a connected for maintaining the casing 15 assembled.

The reel 14 includes a long rod 21 forming a journal. The rod 21 has a threaded end 21a which threadedly engages an inwardly opening threaded socket 23 formed in the end wall 22 of the rear casing portion 18. Said rear wall 22 is internally thickened to accommodate the socket 23, as clearly illustrated in Figure 2.

Figure 5:
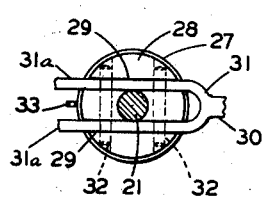
Figure 5 is a fragmentary cross sectional view, taken substantially along a plane as indicated by the line 5—5 of Figure 3.

The right-hand side of the cylindrical wall of the rear housing portion 18 is provided with a journal 24 for journalling a shaft 25. A beveled gear 26 is keyed as seen at 26a in Figure 2 to the shaft 25 and is disposed in the chamber 18a. A beveled gear 27 is journalled on the rod 21, which constitutes a stationary journal, and is disposed in meshing engagement with the bevel gear 26. The beveled gear 27 constitutes one end of a cylindrical guide member 28 which extends from the beveled gear 27 into the rear end portion of the chamber 20 and which is provided with spaced parallel slots 29 which straddle the stationary journal 21, as seen in Figure 5, and which open outwardly of the forward end of the guide 28. A ring, designated generally 30, includes a substantially semicircular bifurcated portion 31 the furcations 31a of which are spaced apart a proper distance to slidably fit the slots 29. A pair of pins 32 extend through the guide member 28 crosswise thereof and in straddling relation to the rod 21 for retaining the furcations 31a in engagement with the slots 29.

The ring 30 is adapted to be moved rotationally in one direction by an actuator 35 which is slidably disposed in a slot 37 formed in upper parts of the forward housing section 16 and the housing portion 19. A stud 36 is fixed to and extends outwardly from a part of the ring 30 which is circumferentially spaced from its bifurcated portion 31, and said stud 36 has an outer portion slidably fitting in the slot 37 and behind the actuator 35.

One end of a contractile spring 38 is anchored to an eye 33 which is fixed to a peripheral portion of the guide member 28, between the slots 29. The spring 38 is coiled around the bifurcated portion 31 and has an opposite end anchored to the ring 30, as seen at 34 in Figure 4, beyond an end of the bifurcated portion 31. The ring 30 is provided with an eye 39 in a part thereof of which is circumferentially spaced from the bifurcated portion 31. The spring 38 urges the ring 30 to turn in a direction to move the stud 36 toward the forward end of the slot 37 and to position the eye 39 in alignment with a flanged opening 40 formed in the front section 16 and which is disposed substantially in alignment with the axis of the reel casing 15. A fishing line 41 is secured to and wound on a spool 42. The spool 42 is disposed on the forward end of the rod 21 and is detachably anchored thereto by a screw 42a which is threaded radially through a part of the spool 42 against the rod 21. Thus the spool 42 which is held stationary with the rod 21 provides a stop for the rotatable guide member 28, the forward end of which bears rotatably against the rear end of the spool 42. The member 28 is thus held against forward displacement on the rod 21 so that its gear 27 is maintained in meshing engagement with the gear 26. The fishing line 41 passes from the spool 42 through the eye 39 and thence outwardly through the casing opening 40.

Figure 6:
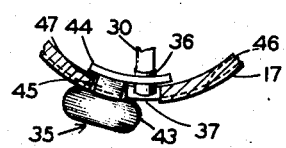
Figure 6 is a fragmentary cross sectional view, taken substantially along a plane as indicated by the line 6—6 of Figure 3.

As best seen in Figure 6, the actuator 35 includes a knob or button 43 which is disposed externally of the casing 15, an elongated base 44, which is disposed internally of the casing 15 and crosswise of the slot 37, and a stem portion 45 which connects the button 43 and base 44 and which slidably fits in the slot 37.

The casing portion 19 is provided with an annular internal groove 46 which intersects the rear end of the slot 37. Said slot 37 is provided with a laterally extending notch 47 disposed adjacent the groove 46, as seen in Figure 1. A conventional reel crank 48, as seen in Figure 1, is secured to the outer end of the shaft 25.

Figure 2:
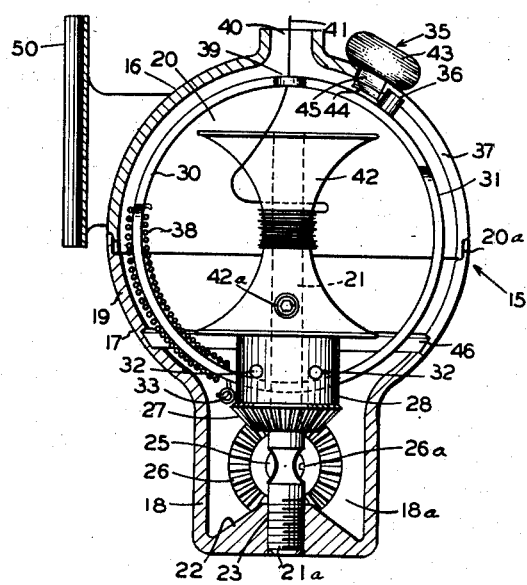
Figure 2 is a longitudinal sectional view thereof, on an enlarged scale, taken substantially along a plane as indicated by the line 2—2 of Figure 1.
Figure 3:
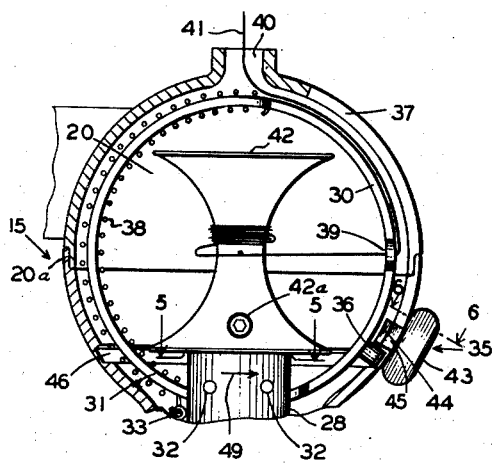
Figure 3 is a fragmentary sectional view taken on the same plane as Figure 2 and illustrating a different position of certain of the parts of the reel from the position of said parts as seen in Figure 2.
Figure 4:
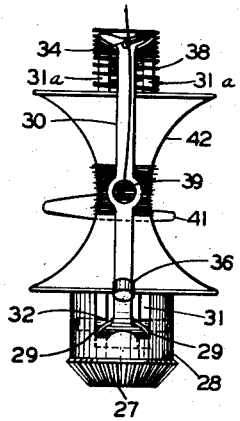
Figure 4 is a plan view of a part of the reel shown removed from the reel housing.

Assuming that the line 41 is wound on the spool 42 and that the ring member 30 is held by the spring 38 in the casting position of the reel 14 as seen in Figure 2, with the eye 39 in alignment with the opening 40, it will be readily apparent that the line 41 may be spun off of the forward end of the spool 42 through the aligned openings 39 and 40 in response to a casting operation of a fishing rod, not shown, on which the reel 14 is mounted and without risk of a backlash occurring. When it is desired to reel in the fishing line 41 and wind it onto the spool 42, the knob 43 is manually engaged and moved rearwardly from its position of Figure 2 to its position of Figure 3. During this rearward movement of the actuator shank 45 in the slot 37, the stud 36 which also engages the slot 37 behind the actuator 35, will be moved rearwardly to the rear end of said slot 37 and in alignment with the groove 46, as seen in Figure 3. The actuator 35 in its position of Figure 3 is moved laterally of the slot 37 into the notch 47, as seen in Figure 6, and when so disposed the transversely elongated base 44 thereof extends across the slot 37. The crank 48 can then be manually turned to rotate the bevel gear 26 in a counterclockwise direction as seen in Figure 2 and so that the guide 28 and ring 30 will be revolved in the direction as indicated by the arrow 49 in Figure 3. The ring 30 which is disposed loosely around the stationary spool 42 will thus revolve around said spool so that the eye 39 thereof which is then radially spaced from the spool 42, as seen in Figures 3 and 4, will revolve around the spool for winding the line 41 on said spool. The outer end of the stud 36 will slide in the groove 46 while the line is being wound on the spool. When the winding operation has been completed, the actuator 35 may be displaced laterally back into the slot 37 to permit the tension spring 38 to return the ring 30 and actuator 35 to their positions of Figure 2, the casting position of the reel 14.

The reel 14 may be provided with any suitable attaching base or saddle 50 by means of which the reel may be mounted in a conventional manner detachably on the reel seat of a fishing rod, not shown. The reel spool 42 may be of any desired shape but is preferably elongated and has its periphery concavely bowed longitudinally from end-to-end thereof.

Figures 7 through 12 illustrate a slightly different form of the fishing reel, designated generally 51. The parts of the fishing reel 51 corresponding to parts of the fishing reel 14 bear the same reference characters and will not be again described in detail. The reel casing 15, the driving gears 26 and 27, the stationary journal 21 and the stationary spool 42 all correspond to the parts bearing the same numerals of the reel 14.

The guide member 52 of the reel 51 differs somewhat from the guide member 28 in that instead of the slots 29, the guide member 28 has curved parallel bores 53 extending through portions thereof and which bores straddle the journal 21. In lieu of the ring 30 of reel 14, reel 51 is provided with two substantially ring shaped members 54, each formed from a strand of wire the end portions of which are secured in one of the bores 53 by a pair of setscrews 55 which are threaded longitudinally into the guide member 52 from its forward end against the ends of the strand which is thus retained in the form of a ring. Thus, the two rings 54 which are disposed in spaced parallel planes have no movement relative to the guide 52, but rather provide a guide for an elongated slide 56 which is arcuately bowed longitudinally and which has laterally projecting ears 57 at each end thereof and which ears are provided with bores 58, as seen in Figure 11, the axes of which are disposed longitudinally of the slide 56. The bores 58 slidably engage the rings 54 for mounting the slide thereon. A spiral contractile spring 59, which replaces the spring 38, has one end anchored to the eye 33 of the member 52. The spring 59 loosely engages on a portion of one of the rings 54 and has its opposite end anchored at 60 to an end of the slide 56, as best seen in Figure 9. The stud 36 projects from the outer side of the other end of the slide 56 and has its outer portion slidably engaging the slot 37 behind the actuator 35. A movable line guide opening 61, which replaces the movable guide opening 39, is formed in the slide 56. The fishing line 41 extends from the stationary spool 42 through the guide opening 61 and thence outwardly through the flanged opening 40 in the forward end of the casing 15.

The spring 59 normally retains the slide 56 in the position as seen in Figure 7 with the opening 61 thereof in alignment with the opening 40 and which constitutes the casting position of the reel, so that the line 41 can be spun off of the outer end of the spool 42 and payed outwardly through the aligned openings 61 and 40, as previously described in detail in reference to the reel 14. With the parts thus disposed, the stud 36 bears against the actuator 35 to retain said actuator at the forward end of the slot 37, as seen in Figure 3. The button or knob 43 of the actuator 35 can be manually engaged for moving the actuator 35, stud 36 and slide 56 to the line retrieving position of the reel 51, as seen in Figure 8, and in which position the actuator 35 is displaced laterally into the notch 47, as seen in Figure 12, to retain the outer end of the stud 36 in a position to engage the annular groove 46. With the parts thus disposed, as seen in Figures 8 and 9, the crank 48 is actuated to turn the shaft 25 and gear 26 which in turn drives the gear 27 to revolve the member 28, the rings 54 and slide 56 in the direction as indicated by the arrow 62 in Figure 8 for winding the line 41 on the spool 42, in the same manner as previously described in reference to the reel 14.

Various other modifications and changes are contemplated and may obviously be resorted to, without departing from the spirit or scope of the invention as hereinafter defined by the appended claims.

I claim as my invention:

1. A fishing reel comprising an elongated stationary journal member, said reel including supporting means engaging and supporting one end of said journal member, a spool fixed to the opposite end of said journal member and on which a fishing line is adapted to be wound, line guiding means turnably mounted on said journal member and including a portion disposed for oscillating movement in one plane about said spool and for rotary movement around the spool in another plane, said line guiding means being turnably mounted on the journal member between said spool and the first mentioned end of the journal member, said portion of the line guiding means including an eye through which the line is adapted to extend and which is disposed beyond the last mentioned end of said journal member and the forward end of the spool in a casting position of the reel, said portion of the line guiding means being movable in an arc in its first plane of movement for positioning the eye thereof in a position radially spaced from the spool and journal member, a manually actuated means for revolving said line guiding means about the journal member and spool in the other plane of rotational movement thereof whereby said eye portion will revolve around the spool in a direction for winding the fishing line on the spool, said supporting means comprising a casing enclosing the spool and line guide means and in which said portion of the line guide means is rotatably disposed, said casing having an opening disposed substantially in alignment with and spaced from the forward end of the journal member and through which the fishing line extends from the guide eye, said casing having an elongated slot, a manually operated actuator slidably disposed in said slot, a stud projecting outwardly from said portion of the line guiding means and slidably engaging said slot behind said actuator whereby said portion of the line guiding means is movable in one direction about its first plane of movement by manual operation of said actuator for moving the guide eye from a casting to a retrieving position, and said casing having an annular internal groove disposed crosswise of and intersecting an end of said slot to receive said stud when said guide eye is in a retrieving position and in which said stud is movable around the journal member when said portion of the line guiding means is revolved about the second plane of movement thereof.

2. A fishing reel as in claim 1, and spring means carried by said line guiding means and including a part connected to said portion of the line guiding means for urging the guide eye to a casting position thereof.

3. A fishing reel as in claim 2, and latch means associated with said casing slot for latching the actuator in a position to retain the stud in engagement with said annular internal groove.

4. A fishing reel comprising an elongated stationary journal member, said reel including supporting means engaging and supporting one end of said journal member, a spool fixed to the opposite end of said journal member and on which a fishing line is adapted to be wound, line guiding means turnably mounted on said journal member and including a portion disposed for oscillating movement in one plane about said spool and for rotary movement around the spool in another plane, said line guiding means being turnably mounted on the journal member between said spool and the first mentioned end of the journal member, said portion of the line guiding means including an eye through which the line is adapted to extend and which is disposed beyond the last mentioned end of said journal member and the forward end of the spool in a casting position of the reel, said portion of the line guiding means being movable in an arc in its first plane of movement for positioning the eye thereof in a position radially spaced from the spool and journal member, a manually actuated means for revolving said line guiding means about the journal member and spool in the other plane of rotational movement thereof whereby said eye portion will revolve around the spool in a direction for winding the fishing line on the spool, said line guiding means including a supporting member rotatably mounted on the journal member between the secured end thereof and said spool, said portion of the line guiding means comprising a ring member extending through and slidably supported by said supporting member for oscillating movement relative thereto in the first plane of movement thereof, said ring member being disposed loosely around the spool and in a plane parallel to the axis of the journal member, said guide eye being formed in a portion of the ring member.

5. A fishing reel as in claim 4, said ring member including a bifurcated segment spaced from the guide eye and having spaced furcations extending slidably through the supporting member and straddling said journal member.

6. A fishing reel comprising an elongated stationary journal member, said reel including supporting means engaging and supporting one end of said journal member, a spool fixed to the opposite end of said journal member and on which a fishing line is adapted to be wound, line guiding means turnably mounted on said journal member and including a portion disposed for oscillating movement in one plane about said spool and for rotary movement around the spool in another plane, said line guiding means being turnably mounted on the journal member between said spool and the first mentioned end of the journal member, said portion of the line guiding means including an eye through which the line is adapted to extend and which is disposed beyond the last mentioned end of said journal member and the forward end of the spool in a casting position of the reel, said portion of the line guiding means being movable in an arc in its first plane of movement for positioning the eye thereof in a position radially spaced from the spool and journal member, a manually actuated means for revolving said line guiding means about the journal member and spool in the other plane of rotational movement thereof whereby said eye portion will revolve around the spool in a direction for winding the fishing line on the spool, said line guiding means including a member turnably mounted on the journal member between its first mentioned rear end and said spool and a pair of ring members supported thereby in spaced apart parallel relation to one another and in planes disposed substantially parallel to the axis of the journal member, said ring members being disposed loosely around the spool, and said portion of the line guiding means comprising an elongated slide slidably supported by said ring members for movement relative thereto in said first plane of movement and for movement with said ring members around the spool in said other plane of movement.

References Cited in the file of this patent

UNITED STATES PATENTS

| | | |
|---|---|---|
| 2,229,470 | Pezon | Jan. 21, 1941 |
| 2,551,320 | Ferguson | May 1, 1951 |
| 2,568,986 | Brown | Sept. 25, 1951 |
| 2,590,369 | Beeler | Mar. 25, 1952 |
| 2,724,563 | Shakespeare et al. | Nov. 22, 1955 |